United States Patent
Liguori

(10) Patent No.: US 9,342,500 B2
(45) Date of Patent: May 17, 2016

(54) OBJECT MEMORY MANAGEMENT SYSTEM

(76) Inventor: Michael V. Liguori, Kunkletown, PA (US)

( * ) Notice: Subject to any disclaimer, the term of this patent is extended or adjusted under 35 U.S.C. 154(b) by 122 days.

(21) Appl. No.: 13/048,183

(22) Filed: Mar. 15, 2011

(65) Prior Publication Data

US 2011/0225204 A1 Sep. 15, 2011

Related U.S. Application Data

(60) Provisional application No. 61/340,233, filed on Mar. 15, 2010.

(51) Int. Cl.
| G06F 17/27 | (2006.01) |
| G06F 3/00 | (2006.01) |
| G10L 15/18 | (2013.01) |

(52) U.S. Cl.
CPC ............ *G06F 17/2785* (2013.01); *G06F 3/002* (2013.01); *G05B 2219/2613* (2013.01); *G10L 15/1822* (2013.01)

(58) Field of Classification Search
USPC .......................................... 707/792; 710/62
See application file for complete search history.

(56) References Cited

U.S. PATENT DOCUMENTS

| 4,084,148 | A | 4/1978 | Koshikawa |
| 4,318,081 | A | 3/1982 | Yoshida |
| 4,486,775 | A | 12/1984 | Catlow |
| 4,642,526 | A | 2/1987 | Hopkins |
| 5,125,039 | A | 6/1992 | Hawkins |
| 5,554,983 | A | 9/1996 | Kitamura et al. |
| 5,757,287 | A | 5/1998 | Kitamura et al. |
| 5,767,793 | A | 6/1998 | Agravante et al. |
| 5,940,011 | A | 8/1999 | Agravante et al. |
| 6,069,696 | A | 5/2000 | McQueen et al. |
| 6,144,916 | A | 11/2000 | Wood, Jr. et al. |
| 6,247,538 | B1 | 6/2001 | Takeda et al. |
| 6,477,272 | B1 | 11/2002 | Krumm et al. |
| 6,529,614 | B1 | 3/2003 | Chao et al. |
| 6,532,301 | B1 | 3/2003 | Krumm et al. |
| 6,590,521 | B1 | 7/2003 | Saka et al. |
| 6,611,622 | B1 | 8/2003 | Krumm |
| 6,683,969 | B1 | 1/2004 | Nishigaki et al. |
| 6,701,026 | B1 | 3/2004 | Zheng et al. |

(Continued)

OTHER PUBLICATIONS

Olympus Architecture.

(Continued)

*Primary Examiner* — Sherief Badawi
*Assistant Examiner* — Christopher J Raab
(74) *Attorney, Agent, or Firm* — Volpe and Koenig, P.C.

(57) ABSTRACT

An object memory management system (OMMS) provides a communications link between a plurality of various types of inputs and a plurality of customers who would normally receive one or more of the various types of inputs. Included among the input signal devices are GPS, infrared (IR), photo cell, range finder, and other type sensors, and signal sources such as data bit stream, pulsed digital signals, verbal and visual signals. Included among the customers are artificial intelligence (AI) and software service providers. The system recognizes a received incoming signal, converts it into a signal the designated customer can recognize and sends it to the designated customer. Signals are processed on a first-in-first-out (FIFO) basis unless a priority designation is received. Complex incoming signals (verbal and visual) require pattern recognition wherein an object database is utilized to understand such incoming signals.

14 Claims, 19 Drawing Sheets

(56) References Cited

U.S. PATENT DOCUMENTS

| | | |
|---|---|---|
| 6,704,454 B1 | 3/2004 | Spence et al. |
| 6,724,931 B1 | 4/2004 | Hsu |
| 6,731,204 B2 | 5/2004 | Lehmann |
| 6,731,777 B1 | 5/2004 | Nishigaki et al. |
| 6,735,632 B1 * | 5/2004 | Kiraly et al. .................. 709/229 |
| 6,741,744 B1 | 5/2004 | Hsu |
| 6,775,395 B2 | 8/2004 | Nishigaki et al. |
| 6,788,817 B1 | 9/2004 | Saka et al. |
| 6,792,147 B1 | 9/2004 | Saka et al. |
| 6,853,738 B1 | 2/2005 | Nishigaki et al. |
| 6,952,496 B2 | 10/2005 | Krumm |
| 6,958,683 B2 | 10/2005 | Mills et al. |
| 6,963,657 B1 | 11/2005 | Nishigaki et al. |
| 6,987,864 B2 | 1/2006 | Nishigaki et al. |
| 7,020,329 B2 | 3/2006 | Prempraneerach et al. |
| 7,046,167 B2 | 5/2006 | Rao et al. |
| 7,092,566 B2 | 8/2006 | Krumm |
| 7,148,913 B2 | 12/2006 | Keaton et al. |
| 7,158,015 B2 | 1/2007 | Rao et al. |
| 7,187,445 B2 | 3/2007 | Schanz et al. |
| 7,239,228 B2 | 7/2007 | Kim et al. |
| 7,255,161 B2 | 8/2007 | Durach et al. |
| 7,403,641 B2 | 7/2008 | Nakamoto et al. |
| 7,480,570 B2 | 1/2009 | Yopp et al. |
| 7,554,484 B2 | 6/2009 | Zimmermann et al. |
| 7,558,762 B2 | 7/2009 | Owechko et al. |
| 7,574,045 B2 | 8/2009 | Simon et al. |
| 7,599,894 B2 | 10/2009 | Owechko et al. |
| 7,672,911 B2 | 3/2010 | Owechko et al. |
| 7,844,242 B2 * | 11/2010 | Rofougaran et al. ......... 455/333 |
| 8,326,637 B2 | 12/2012 | Baldwin et al. |
| 8,949,124 B1 * | 2/2015 | Wooters ........................ 704/235 |
| 2001/0041980 A1 * | 11/2001 | Howard et al. ............... 704/270 |
| 2004/0167847 A1 * | 8/2004 | Nathan ............................ 705/37 |
| 2005/0162513 A1 * | 7/2005 | Chan ............................. 348/118 |
| 2005/0177745 A1 * | 8/2005 | Oswald et al. ................ 713/201 |
| 2007/0265850 A1 * | 11/2007 | Kennewick et al. .......... 704/257 |
| 2007/0299802 A1 * | 12/2007 | Kwok ............................. 706/52 |
| 2008/0159744 A1 * | 7/2008 | Soto et al. ..................... 398/115 |
| 2008/0256008 A1 * | 10/2008 | Kwok ............................. 706/20 |
| 2008/0313126 A1 * | 12/2008 | Fredriksson .................... 706/59 |
| 2009/0138415 A1 * | 5/2009 | Lancaster ....................... 706/11 |
| 2010/0077114 A1 * | 3/2010 | Izutsu ............................. 710/62 |
| 2010/0082230 A1 * | 4/2010 | Hong et al. .................... 701/201 |
| 2010/0088258 A1 * | 4/2010 | Oaten et al. ................... 706/13 |
| 2010/0228447 A1 * | 9/2010 | Serban et al. ................... 701/49 |
| 2011/0045839 A1 * | 2/2011 | Chao ........................... 455/456.1 |
| 2012/0209848 A1 * | 8/2012 | Christensen et al. .......... 707/737 |
| 2013/0054228 A1 | 2/2013 | Baldwin et al. |

OTHER PUBLICATIONS

RavenClaw dialouge manager.

* cited by examiner (to Fig. 4b)

OBJECT MEMORY MANAGEMENT SYSTEM

BACKGROUND OF THE INVENTION

The present invention is directed to a signal or instruction recognition, diagnostic and conversion system.

In today's high tech world there will be a need to standardize the Application Program Interfaces (API) and protocols of Recognition Devices that supply data to an artificial intelligent (AI) and software services. This standardization applies to how data is stored and how it interacts with an AI service or a software service.

Currently, recognition devices (RD) are being developed for niche tasks. Once these products take hold it would be costly and time consuming to standardize them, in a high tech world that would demand products become more modular and plug and play. Standardization would be critical with many manufacturers creating RDs of the same type (e.g. vision and speech) with different protocols and differences amongst the software; further examples of why we need standardization will be explained.

Thus, in modern day communication system environments and control system environments there has arisen a need for standardization of signal or instruction circuitry in order to eliminate the redesign of artificial intelligence input circuits or software service systems to accommodate a change in input signals or information of instructions, or the introduction of new inputs.

Examples of such changes would include the redesign of cell phone circuitry to accommodate changes or additions in signal transmission protocol, or the redesign of control system circuits when input sensors or input signal sources are changed or added.

An object of the present invention is to provide a customer with a signal or instruction designated for the customer in a format, protocol, signal data, signal frequency, strength or carrier, or with other signal parameters that the customer can recognize and understand, and can react to without a change to that customers existing design.

A second object is to provide the customer with sufficient additional information for a customer to know how to react.

A further object is to link a foreign signal source to an existing customer but having the customer receive an output signal from the invention as if it were coming from the foreign signal source.

SUMMARY OF THE INVENTION

The objects of the invention are realized in an object memory management system (OMMS) which provides a communications link between a plurality of various types of incoming signals or instructions or requests and a plurality of customers, at least one of whom is designated to receive the incoming signal/instruction/request. The system recognizes a received incoming signal, converts it into a signal the designated customer can recognize and sends it to the designated customer. Signals are processed on a first-in-first-out (FIFO) basis unless a priority designation is received.

A customer instruction definition database is maintained to list (define) the signal/instruction/request characteristics each customer is designed to receive. The characteristics can include an information signal, instruction format, instruction protocol or the other requirements of each particular customer, for example, frequencies, signal strength, carrier frequencies required by a hardware customer.

Hardware generated incoming signals are recognized, associated with the designated customer and then converted according to the customer instruction database definitions for that designated customer and then sent to the designated customer. A feedback signal that the customer received the communication may be utilized.

Software generated incoming signals such as verbal and visual communications are recognized, understood, and then processed as with the hardware generated incoming signals.

However these software generated incoming signals are much more complex. A pre-programmed object database is maintained and is utilized in the understanding operation of the verbal and visual incoming signal/instruction/request. The database may be expanded off-line.

The processing of software generated signals may require pattern recognition wherein an object database is utilized repetitively to understand such incoming signals.

As all incoming signals/instructions/requests are processed FIFO, a queue is maintained and managed. Complex incoming signals/instruction/requests are processed piecemeal, i.e., in stages. With an interaction manager supervising the reinsertion of a complex signal/instruction/request at the back of the queue until the entire input is understood. It thereafter is sent to the designated customer according to the appropriate customer's instruction definitions. Regarding such software signals/instructions/requests, the customer may be queried for the receipt of the invention's output to it.

The invention, the object memory management system, does not modulate RF (radio frequency range) frequencies, nor does it demodulate such RF frequencies. Likewise, It does not pass on an actual incoming signal (raw data). What the present invention does is handle information from devices, learns what that information is, and then sends designated information (as an output) which is understandable by the designee.

BRIEF DESCRIPTION OF THE DRAWINGS

The features, advantages and operation of the present invention will become readily apparent and further understood from a reading of the following detailed description with the accompanying drawings, in which like numerals refer to like elements, and in which.

DETAILED DESCRIPTION OF THE INVENTION

Figure 1:
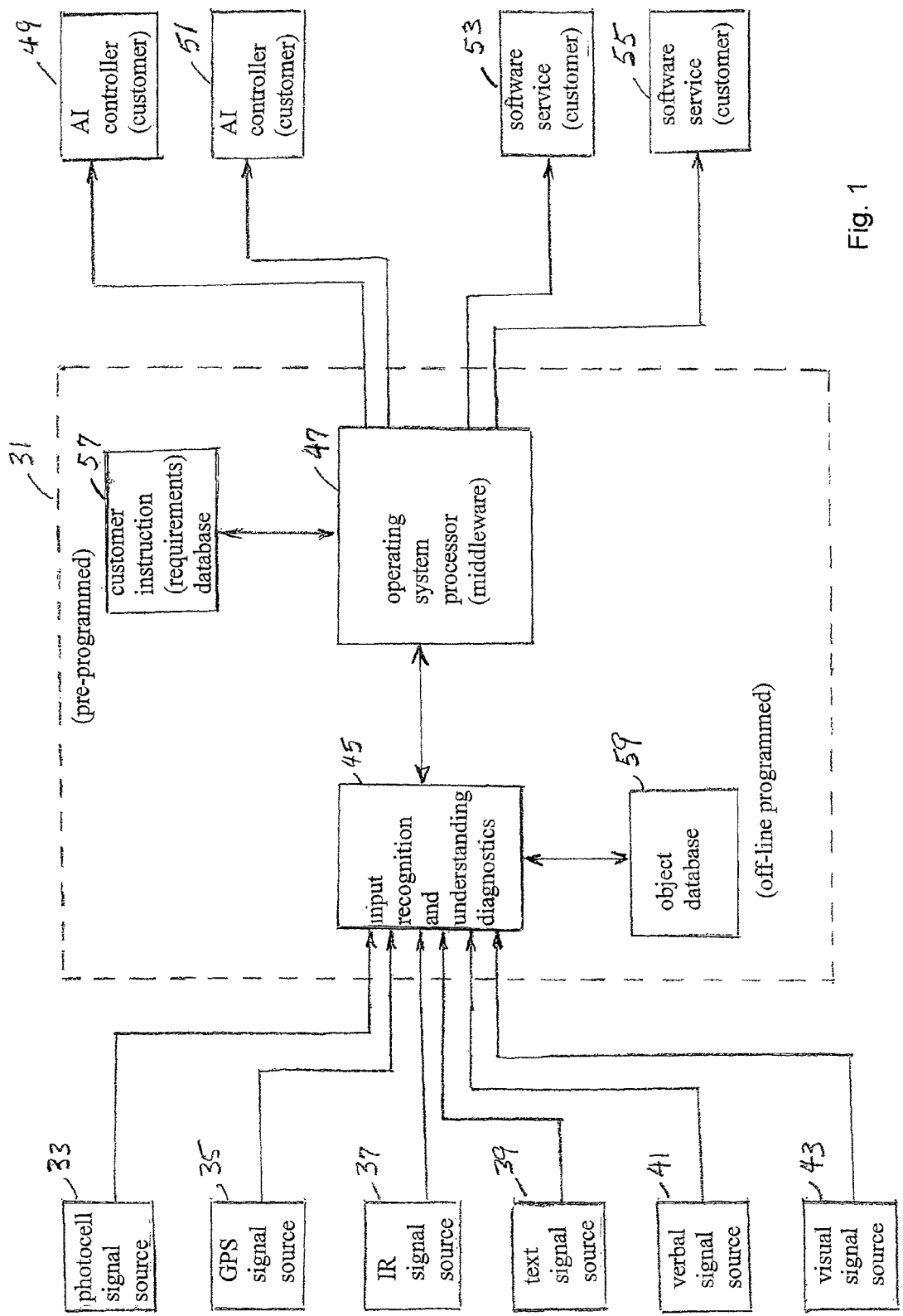
FIG. 1 is a system block diagram including connections to input signal sources and output customers.

The present invention is an object memory management system (OMMS) 31, FIG. 1, which interfaces between signal sources (input data) and customers for which the signals are intended, but are not capable of receiving the signals without circuit and/or software redesign.

A scalable object memory management system (OMMS) is provided to maintain input data and supply it to customers such as an artificial intelligence (AI) controller or a software service. OMMS system translates (converts) "legacy protocols" to a "standardized format" whereby a receiving customer can recognize and understand the transmitted data. An AI can include any control system or circuit which operates machinery or equipment from industrial process and manufacturing controllers to audio equipment or video equipment or communications devices (cell phones and ibooks®, etc.). A software service can include any software driven device or system from a router box in a LAN system, to an Internet search service, to a web-based communication device, etc.

The system permits an AI and/or software service developer to work within a bounded environment for user-to-software service interaction. The OMMS system will enable the service to think/understand what the user is conveying to it so the software service can take an action.

The OMMS system operates with a recognition device (RD) to act as an "interpreter" of the recognition device(s) outputs to and AI (controller) or a software service. Modules within the OMMS system operate upon visual-based or speech-based actions. "Object data" is utilized in the conversion. However, object data in the invention is not limited to visual (video) or speech; any input from a device providing information, and not raw data, is interpreted and converted.

In order to accommodate multiple recognition devices, each providing different kinds of data, the OMMS system operates upon the presumption that incoming data is of different formats when identifying objects. For example, a car might be using a GPS, a Vision System and/or Sonar in the future to drive itself. These input devices are all providing and using data that will be conveyed to and from the AI controller. The AI controller would have a list of objects in active memory provided by the OMMS system upon starting the car. This list of objects would allow the AI controller (service) to recognize risk situations through a vision system and sonar, and determine whether or not to stop or slow down when a deer is suddenly detected as a threat of impact to the car. This is just one example.

In FIG. 1, the OMMS system 31 receives signals from a plurality of signal sources, such as photocell 33, GPS 35, infrared (IR) 37, text (optical character recognition) 39, verbal (spoken words) 41 and visual (photographic), including Jpeg, Tiff, and PDF) 43 sources. Included in OMMS 31, are input recognition and learning diagnostic circuitry and/or software 45 which receives sources 33, 35, 37, 39, 41, 43 signals. This recognition and learning module 45 is connected to the OMMS software (middleware) resident in an operating system processor 47. The processor software 47 recognizes a "token" (which is a processing request, i.e., an internal processing directive) and processes that token into a signal, or instruction, or action directive (service action) to feed it to the appropriate artificial intelligence (AI) controller customer being one of a plurality of such AI controllers 49, 51 customers, or to feed it to the appropriate software service customer being one of a plurality of such software service 53, 55 customers. A particular one of the customers 49, 51, 53, 55 is the recipient of the output of the OMMS system 31 depending upon the contents of the directive "token".

Included in the OMMS system 31 is a database of customer instruction requirements 57. This database 57 is preprogrammed with customer signal and/or instruction information. It informs the processor middleware 47 of such customer facts as signal information, instruction format, instruction protocol and other such customer requirements for a software customer to recognize and act upon an input, or such signal information as frequencies, signal strength, carrier frequencies for a hardware customer to recognize and act upon an input. An object database 59 which can be programmed and updated from time-to-time, while off-line, is utilized by the recognition and understanding diagnostics 45 principally with verbal and visual signal inputs.

The present invention, OMMS system 31 includes several operational "modules". These include: an object data manager (ODM); an identify action manager (IAM); a new object creation (NOC); a test object bounds (TOB); and an input manager (IM). There may also be an external interface "neo-objects". The ODM views (reads) object data. When object data is obtained from storage it becomes active. The IAM registers a command or action from an AI controller (service) or a software service. The AI and software services can access and application program interface (API) to communicate with the system and invoke commands. The NOC controls and manages the creation of new objects. It ensures that bounded objects are created having accessibility. The TOB addresses new object data which is created or updated to have bounds by testing and controlling the bounds of growth within a specific object data. Uncontrolled bounds or the lack of the management of object relationships leads to errors as the performance of the active object memory is important to scalability of information in the system. The IM controls and manages different device inputs such as speech recognition, vision (visual and photographic) recognition, GPS, sonar and other hardware devices. NeoObjectives is an application for loading initial object data.

Figure 2:
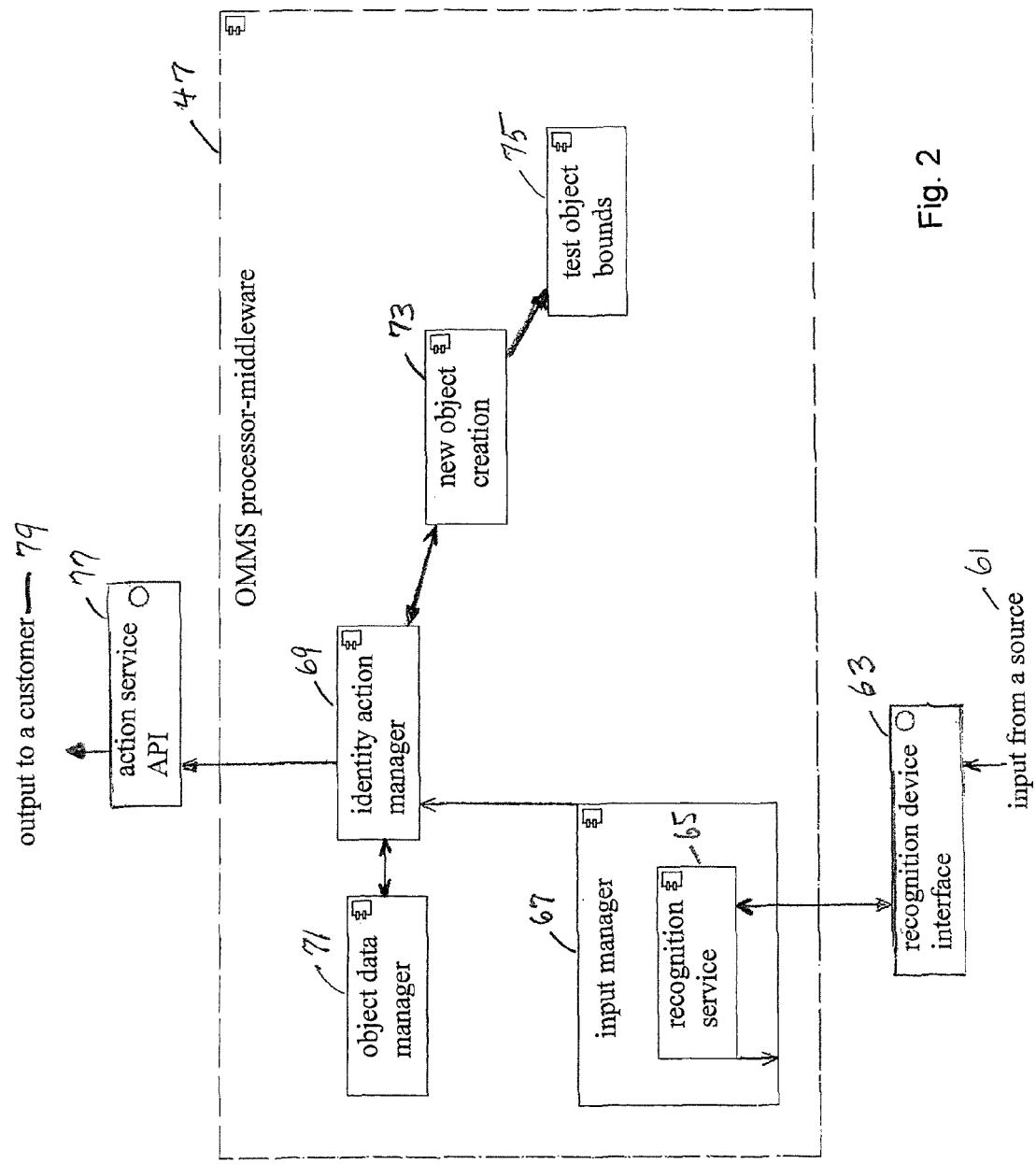
FIG. 2 is a block diagram for the object memory management system (OMMS) processor middleware modules.

FIG. 2 shows the major operational modules within the middleware processor 47. These modules can be implemented in hardware, in a combination of hardware and software, in embedded software (firmware), or in software resident within a processor.

Input from a source 61 is received by a recognition device interface 63. This interface 63 communicates with a recognition service 65 which resides within (is a sub-module of) and communicates with an input manager (IM) 67. The input manager (IM) 67 sends its output to an identity action manager (IAM) 69. The IAM 69 communicates with an object data manager (ODM) 71. The IAM also communicates with a new object creation (NOC) module 73, which NOC 73 is connected to a test object bounds (TOB) module 75. The output from the IAM 69 is sent to an action program manager module 77 which sends an "action service" (service action) to a customer 79.

Figure 2A:
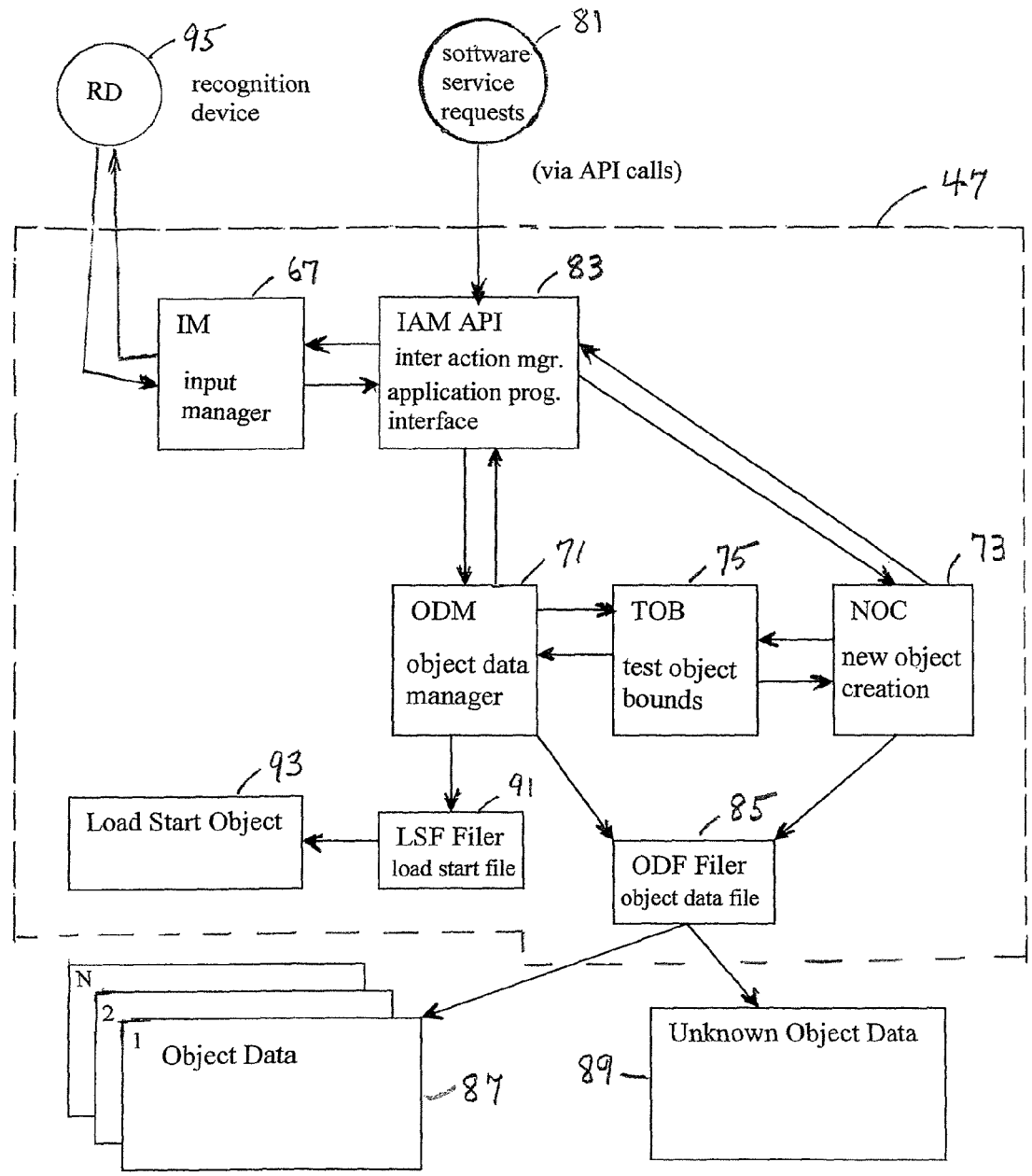
FIG. 2a is a block diagram for the OMMS system processor middleware showing the logic function and decision blocks.

The logic function and decision blocks within the OMMS system middleware processor 47 are shown in FIG. 2a. Software service requests 81 are received via application program interface calls by an interaction manager application program interface (IAM API) 83. This module 83 communicates with the input manager (IM) 67, with the object data manager (ODM) 71, and with the new object creation module (NOC) 73. Both the ODM 71 and the NOC 73 communicate with the test object bounds module (TOB) 75 and an object data file filer (ODF filer) 85. The ODF filer 85 has a connection with modules 87 and 89. The ODM 71 feeds and load start file filer (LSF filer) 91 which in turn feeds a load start object module 93. The input manager (IM) 67 communicates with a recognition device (RD) 95.

Figure 3:
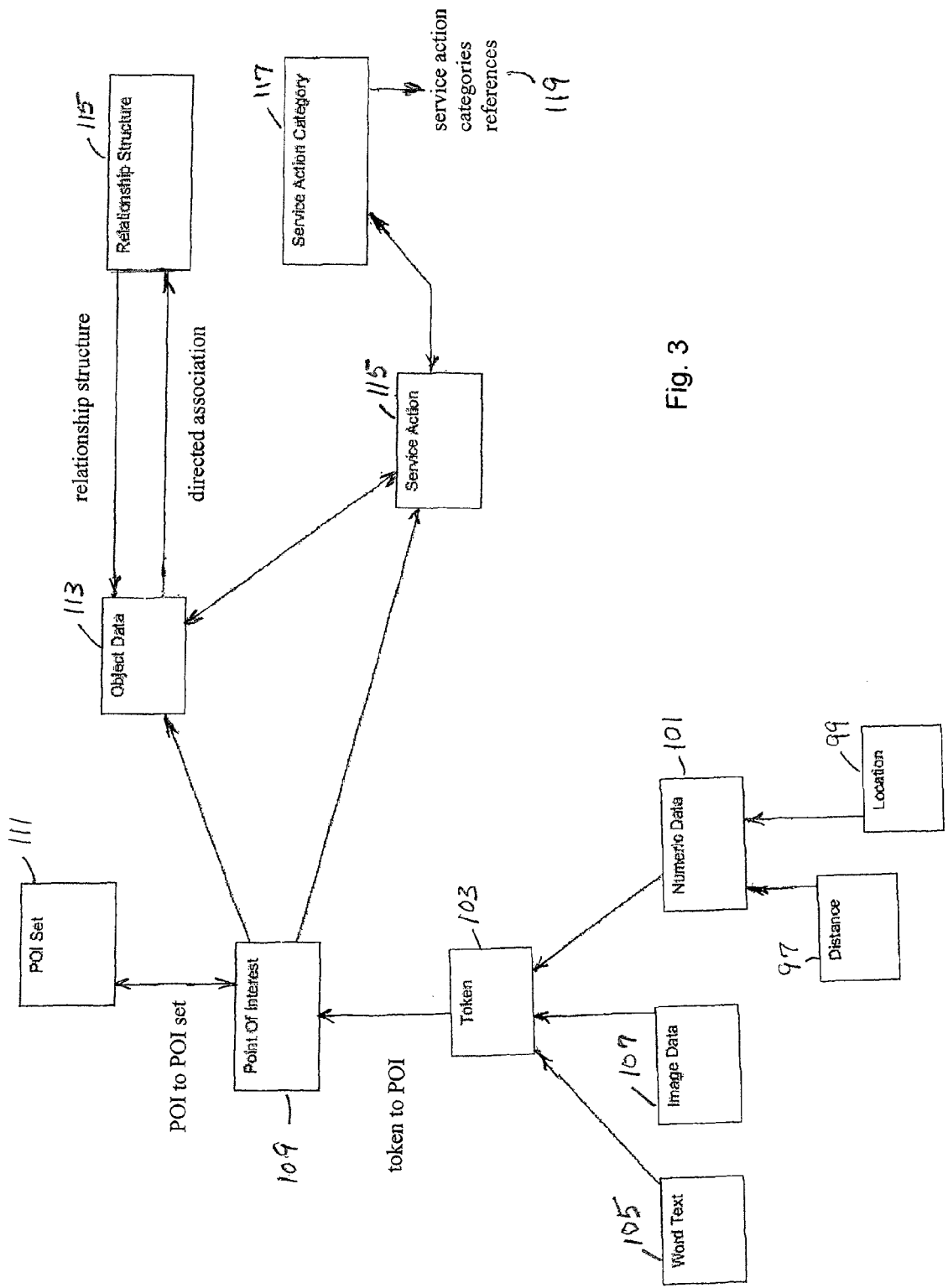
FIG. 3 is a block diagram of action modules of the processor middleware.

FIG. 3 shows the action modules of the processor middleware 47. Distance information 97 and location information 99 are treated as numeric data 101. This numeric data 101 is used to create a "token" 103. A "token" is a processing request and/or an internal processing directive based on information or data received from source devices. Word text 105 and image data 107 are also used to create a "token" specific to their attributes. A token is used to generate a point of interest (POI) 109. Point of interest 109 information is used to generate a "set of POIs (POI set) 111. POI information is used to allocate object data information 113 which is dependent upon relationship structure information 115. Point of interest information 109 and object data information 113 are used in generating a service action 115 which uses service action category information 117 based upon service action category references 119.

Figure 4A:
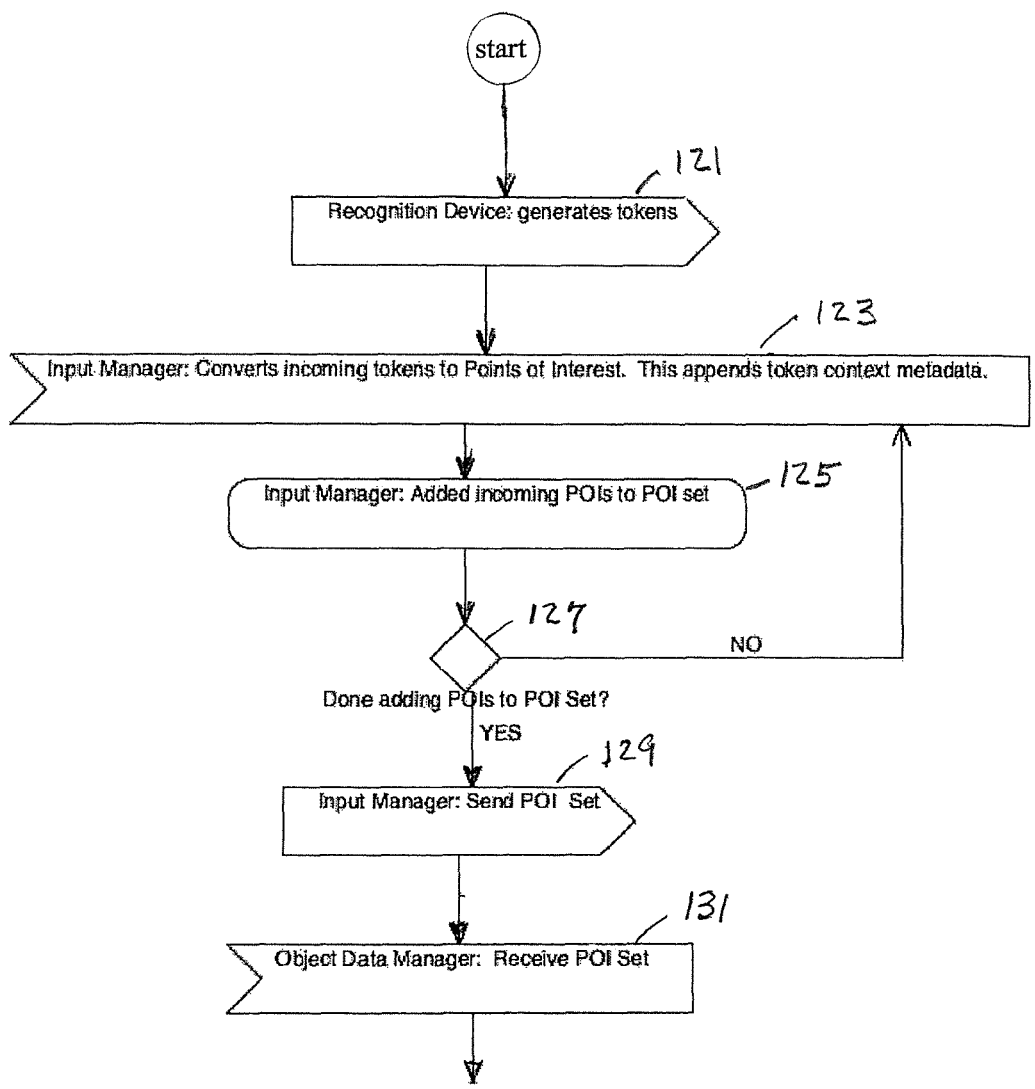
FIGS. 4a, 4b, 4c comprise a logical flow chart for the determination and dispatch of service action requests (tokens)
Figure 4B:
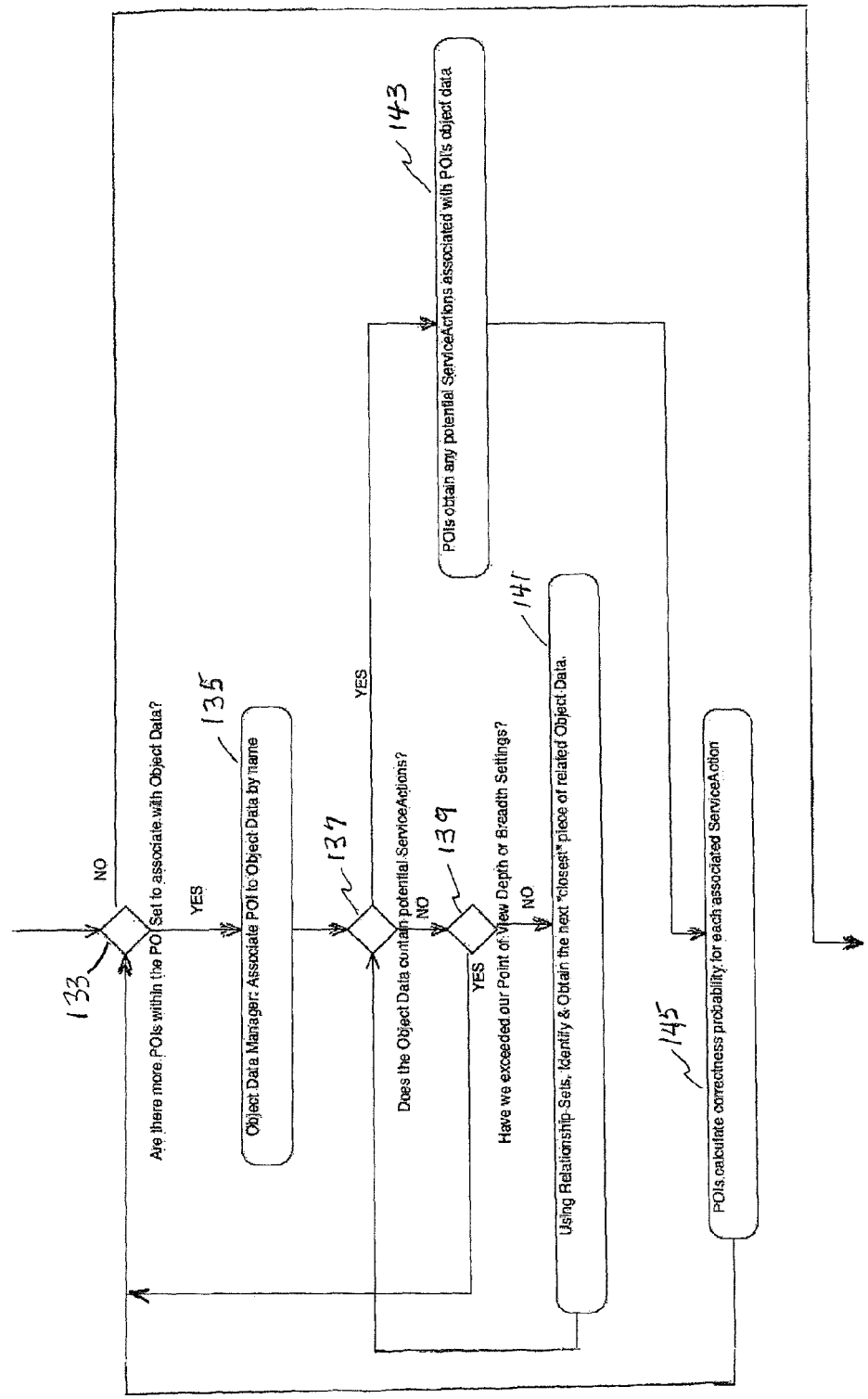
Figure 4C:
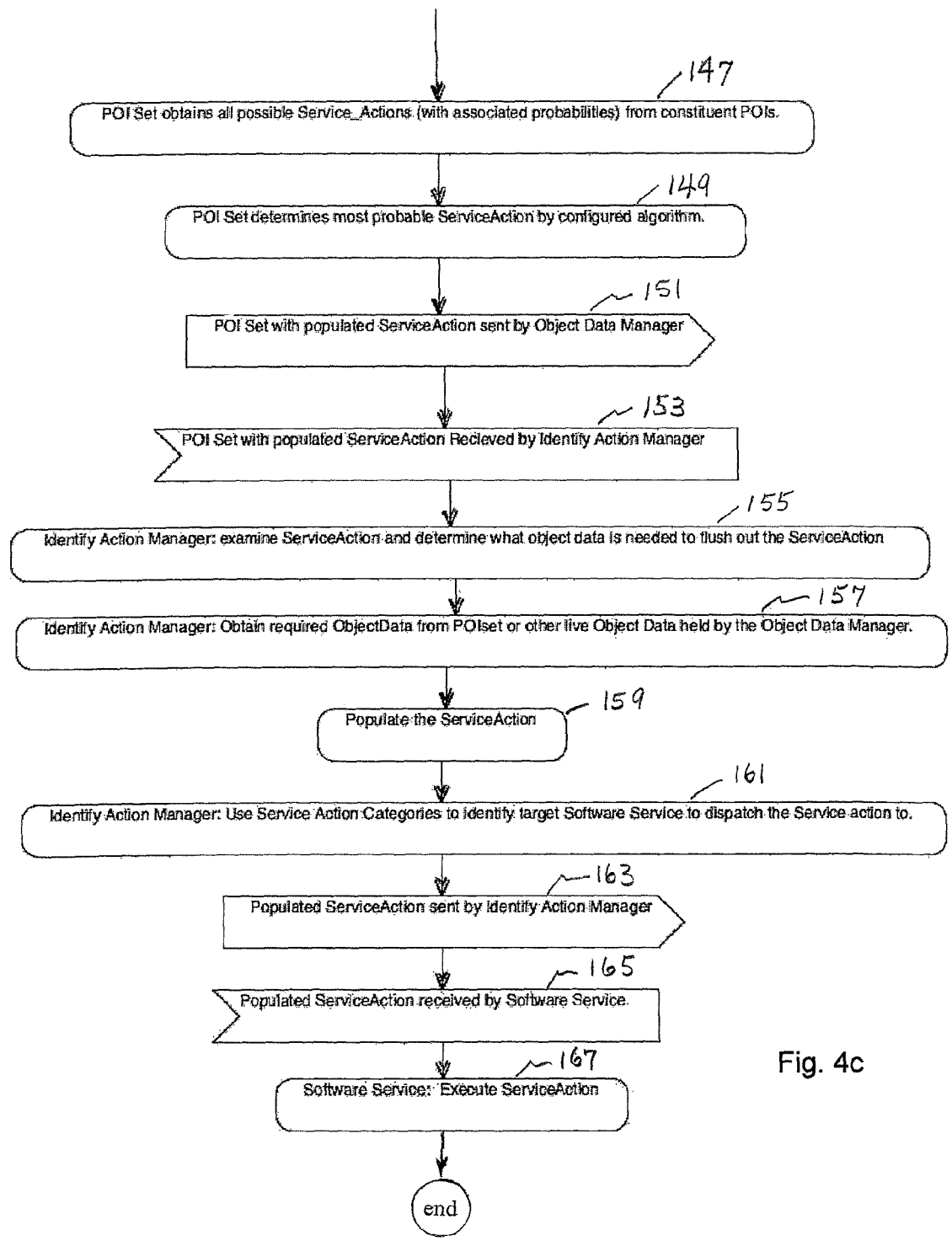

FIGS. 4a, 4b and 4c show a logic flow chart for determining and dispatching service requests ("tokens"). In doing this the recognition device generates a token (tokens) step 121. The input manager then converts an incoming token(s) into a point(s) of interest depending upon token context metadata 123. The input manager then adds incoming POIs into a POI set 125. If the set is complete 127 the input manager dispatches the POI set 129. If it is not complete 127 additional incoming tokens are converted into points of interest 123. The object data manager receives the PIO set 131.

It is then determined, FIG. 4b, if there are additional POIs in the set to associate with the object data 133. If yes, the object data manager associates a POI to object data by name 135. It is then determined if the object data contains potential service actions 137. If not it is then determined if point of view depth or breath settings have been exceeded 139. If yes the system returns to step 133 to determine if there are more POIs with the set to associate with object data.

If the point of view depth or breath settings have not been exceeded, step 139, relationship sets are used to identify and obtain the next closest piece of related object data 141 and then service actions are again looked for in the object data 139. If there are object data contains potential service actions 137 the any potential service actions are obtained 143 and the correctness probability for each associated service action is calculated 145. Having done this, the POI set is again examined for POIs to associate with object data 133.

If there are none, the POI set obtains all possible service action from the constituent POIs 147, FIG. 4c, and then determines the most probable service action 149. Thereafter, the POI set is populated with service actions from the object data manager 151 and populated with service actions from the identity action manager 153. Thereafter the identity action manager examines each service action to determine what object data is need 155 and obtains the object data from the POI set or from the object data manager 157. A service action is then populated 159. Thereafter, the identity action manager uses service action categories to identify a target software service to which to dispatch the service action 161, and the populate service action is sent by identify action manager 163 to the software service 165. The executable service action is thereby available to the software service customer 167.

Figure 5:
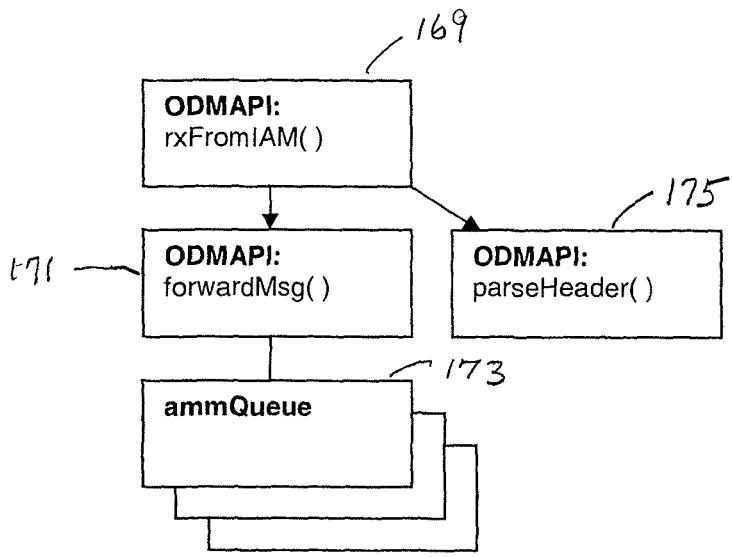
FIG. 5 is a flow diagram showing how the ODM receives messages.

FIG. 5 is a flow diagram of how ODM 71 receives messages from IAM 69 though a listening thread called "rxFromIAM" 169. A "listening thread" occurs at an active node where a code call occurs to receive an event. The listening thread step forwards the message 171 to the queue "ammQueue" 173. A parsed header is also initiated 175.

Figure 6:
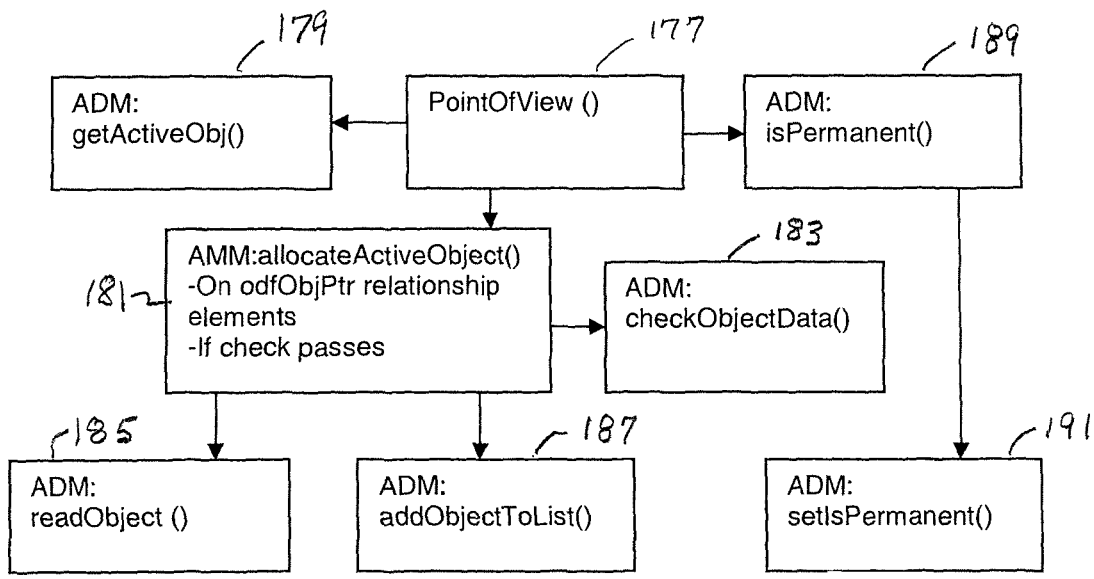
FIG. 6 is a flow diagram showing how the point of view (POV) module operates.

FIG. 6 shows how the point of view (POV) 197 operates. The point of view function 177 is a recursive call that is used to allocate active object data 179. Point of view checks if the object data is already active 181 and if not allocated the object 183. The object data is read 185 and added to the list of objects 187. Thereafter the object is checked to determine if it is permanent 189 and if true set is permanent is called 191. After allocating the object data, point of view considers the value to mean the depth limit sent.

Figure 7:
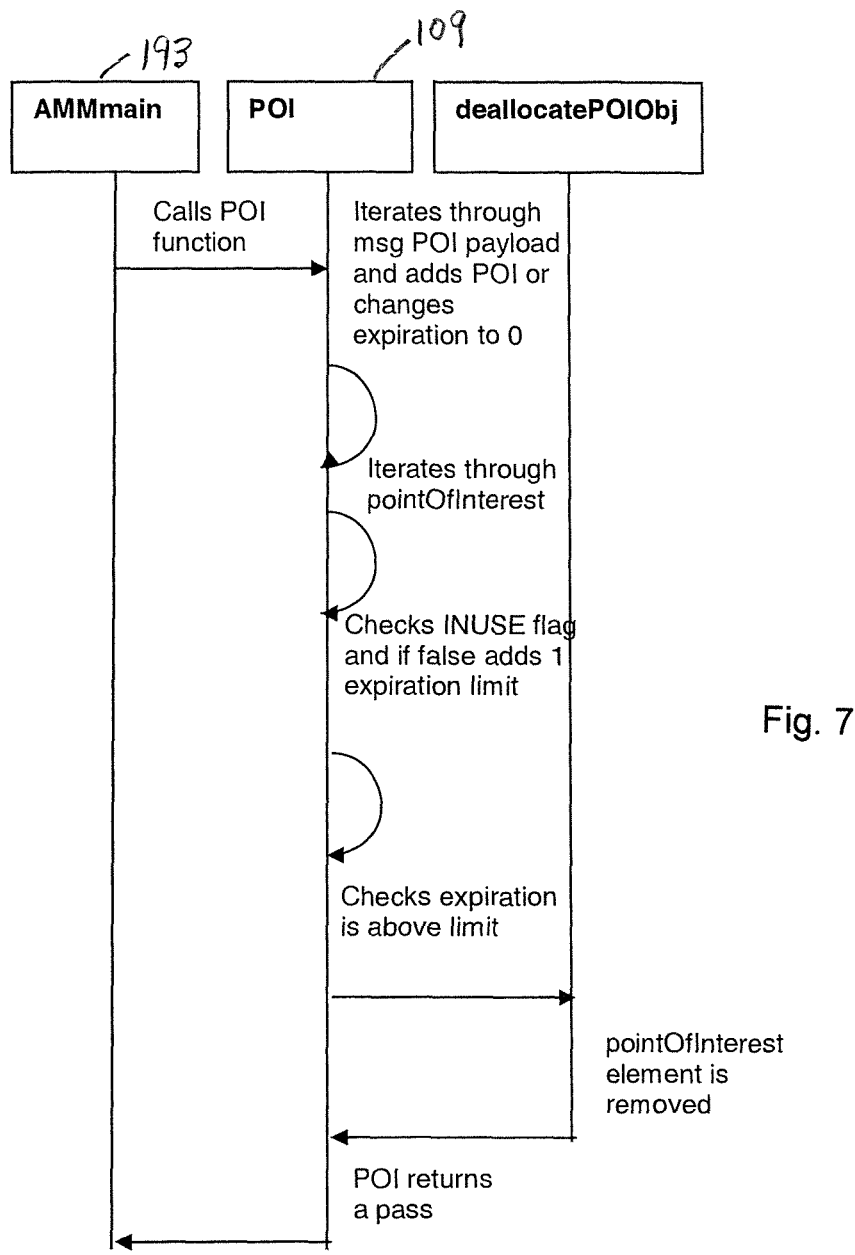
FIG. 7 is a block diagram which shows how points of interest (POI) are added and removed when the input manager (IM) module passes across information "tokens" being sent from the recognition device (RD) to the input action manager (IAM) module.

FIG. 7 shows how POIs (points of interest) 109 are added and removed when the IM (input manager) 67 passes across tokens from the recognition device (RD) 95 to the interaction manager (IAM) 69. The IAM 69 then passes the message containing the POIs 109 to the ODM 71. The main ODM thread, "AMMmain" 193, then begins the processing of the messages to respective routines.

Figure 8:
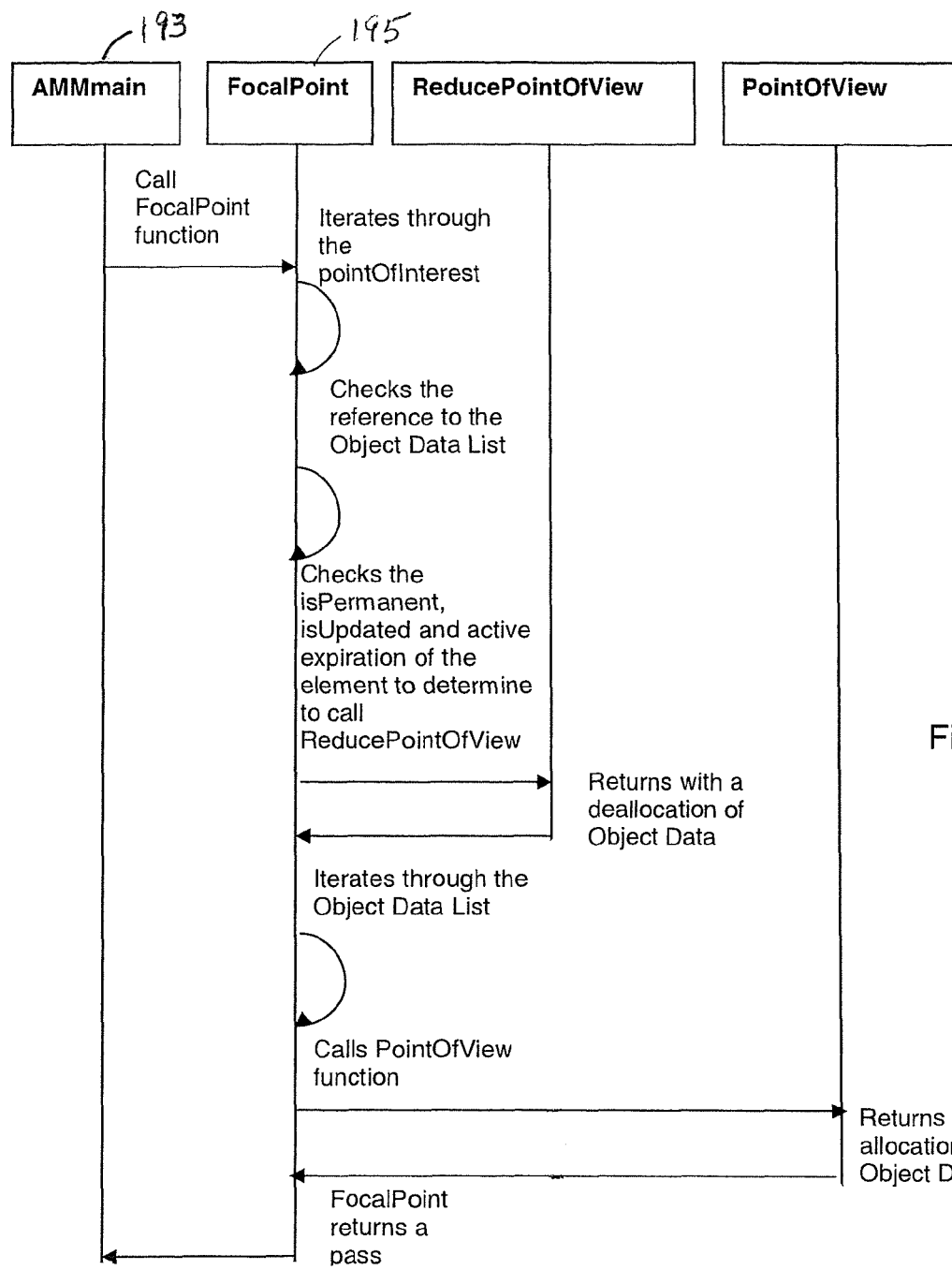
FIG. 8 is a block diagram which shows how object data (OD) is allocated to the system bases upon POIs passed in from the recognition device module.

FIG. 8 shows how object data 113 is allocated to the system based on the POIs 109 that were received from the recognition device (RD) 95. The main object data manager (ODM) 71 thread, "AMMmain" 113, has processed the POIs 109 so that it now has a focal point 195 of what object data (OD) 113 to allocate in active memory. Once this occurs, a point of view (POV) 197 is available from which to base a decision on object data and points of interest.

Figure 9:
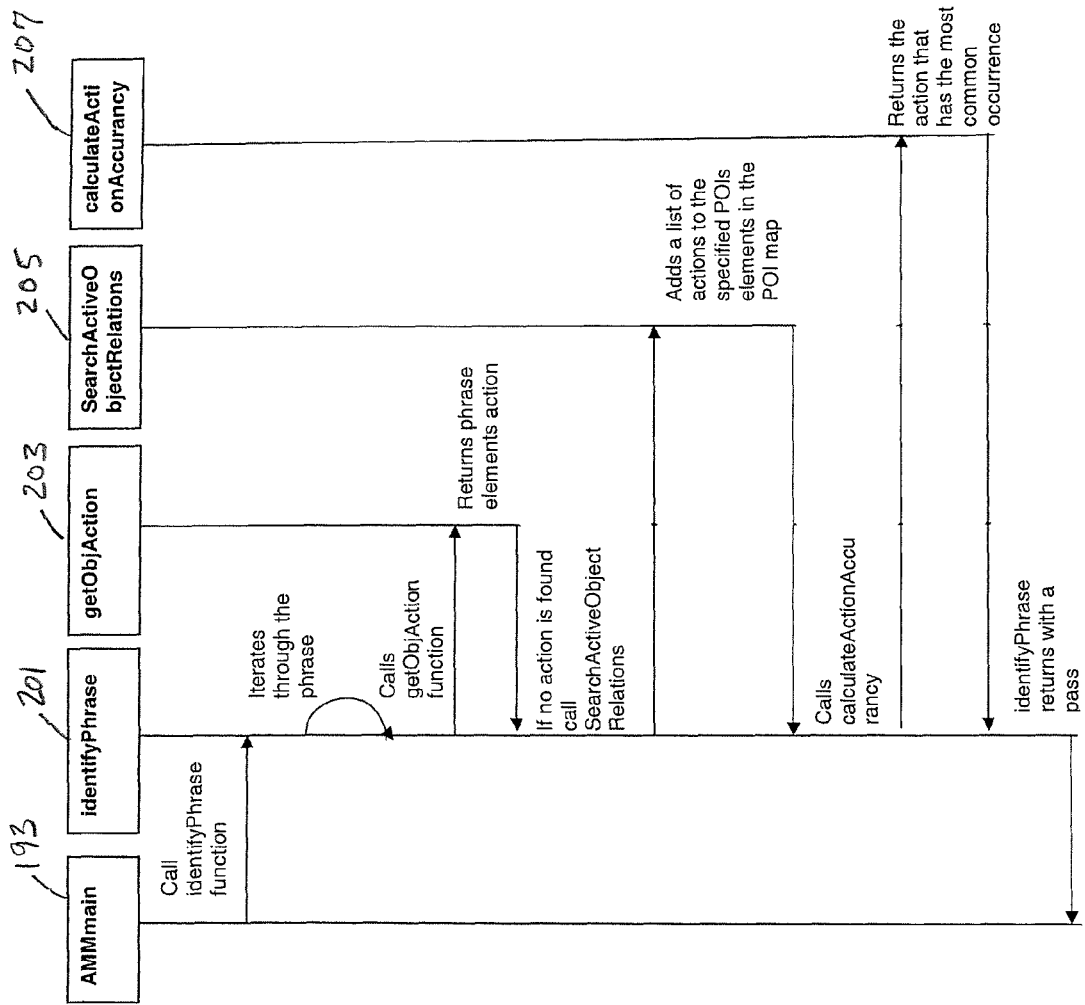
FIG. 9 is a block diagram which shows how the POI module uses the inherit behavior of the object data (ODs) to identify the action of the POIs that came from the recognition device (RD)

FIG. 9 shows how the point of view 197 uses the inherit behavior of the object data (OD) 113 in order to identify the action of the points of interest (POIs) 109 that are received from the recognition device (RD) 95. The main objection data action (ODM) 199 thread, AMM main 193, creates a point of view and identifies a phrase 201 which is a calculation command. Each OD 113 can relate to one or more service actions 115 as shown. These include get object action 203, search active object relations 205 and calculate action accuracy 207.

Figure 10:
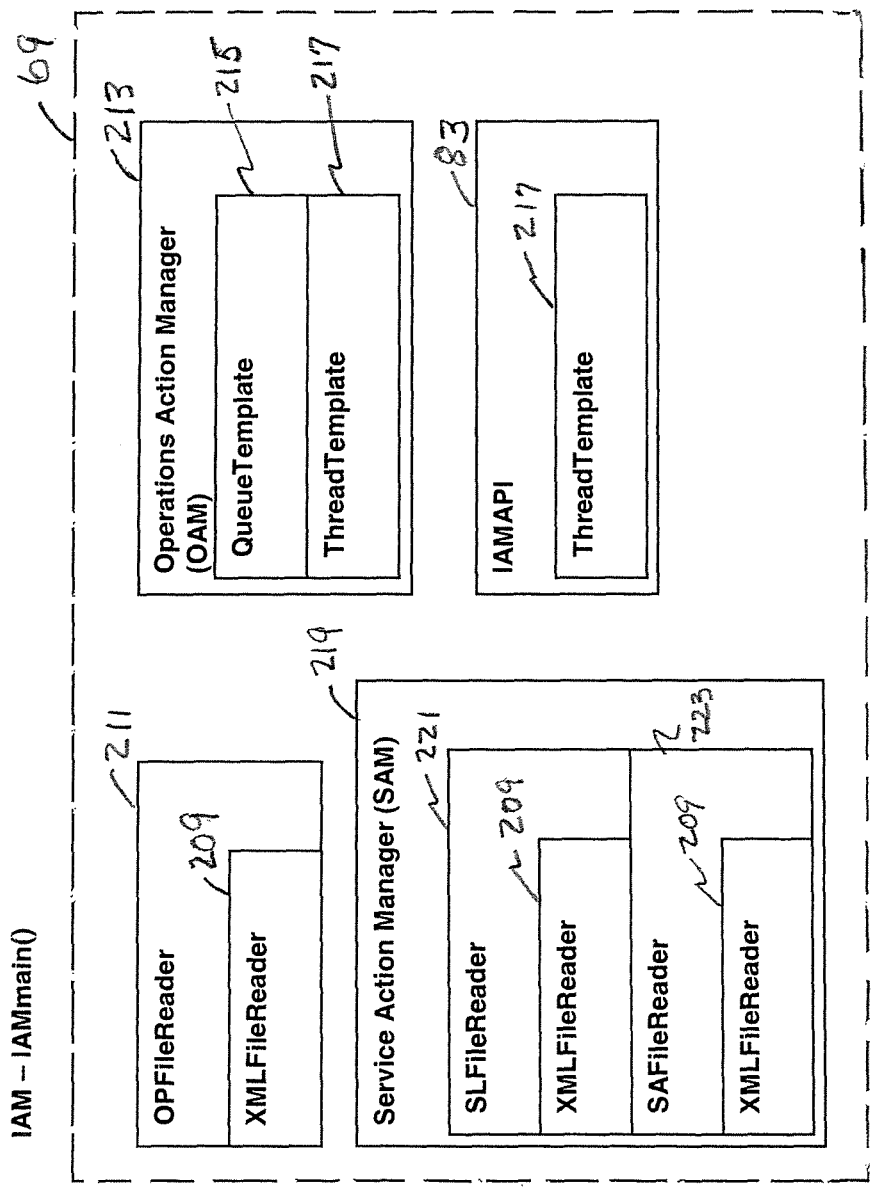
FIG. 10 is a block diagram of the component (module) structure of the interaction manager (IAM)

FIG. 10 shows the component structure of the interaction manager (IAM) 69. Included is a code file reader 209 imbedded within an OP (operating property) file reader 211. Also included is an operations action manager (OAM) 213 containing a queue template 215 and a thread template 217 embedded. The IAM 69 also contains a service action manager (SAM) 219 holding the SLF (service list file) file reader 221 with a code reader 209 embedded therein. The SAM also contains a SAF (service action file) file reader 223 having its own code file reader 209. The interaction manager (IAM) 69 also contains an IAM API (interaction manager application program interface) 83 having its own thread template 217.

Figure 11:
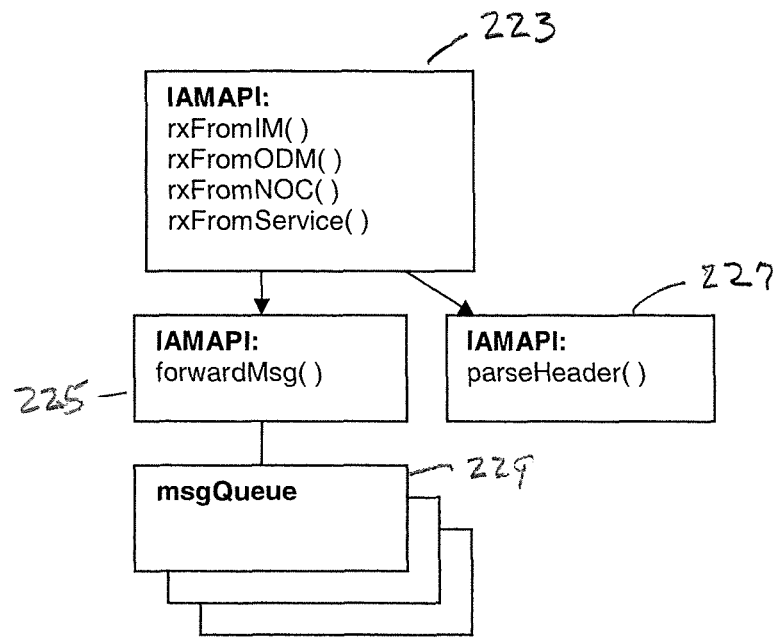
FIG. 11 is a flow diagram which shows how the IAM receive messages from other component modules through "listening threads"

How the IAM 69 receives messages 223 from other components though listening threads called "rxFromIM", "rxFromODM", "rxFromNOC" and "rxFromService" is shown in FIG. 11. These messages are forwarded to the interaction manager application program interface 225 with a parse header also being created 227. The message queue is interrogated 229 as a part of the process. Certain ports and IP addresses are listened on. When a message is received the header is parsed in order to read it. It is then determined if the message needs to be added to the queue or it is a continuation of a message on the queue.

Figure 12:
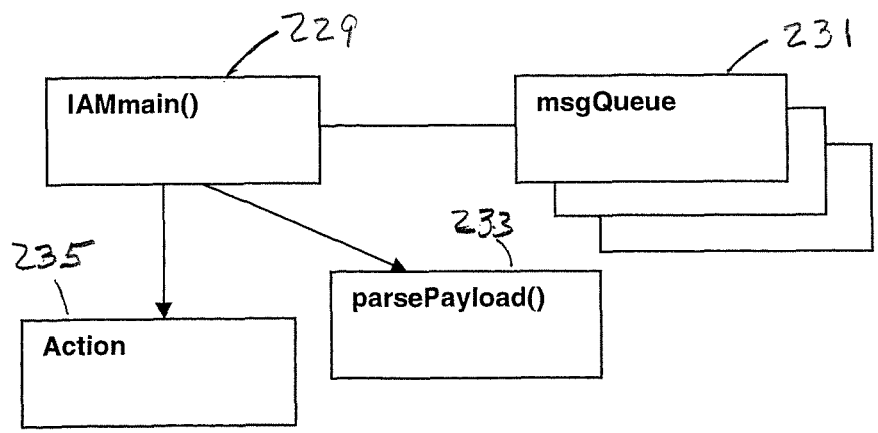
FIG. 12 is a flow diagram which shows how the IAM uses the interaction manager main module to invoke commands put into an action queue.

The IAM 69 use of the IAMmain thread 229 to invoke commands that are put in queue is shown in FIG. 12. The IAMmain 229 iterates though the queue calling a parse payload 233 to read the message, and then initiates what action 235 the message directs.

Figure 13:
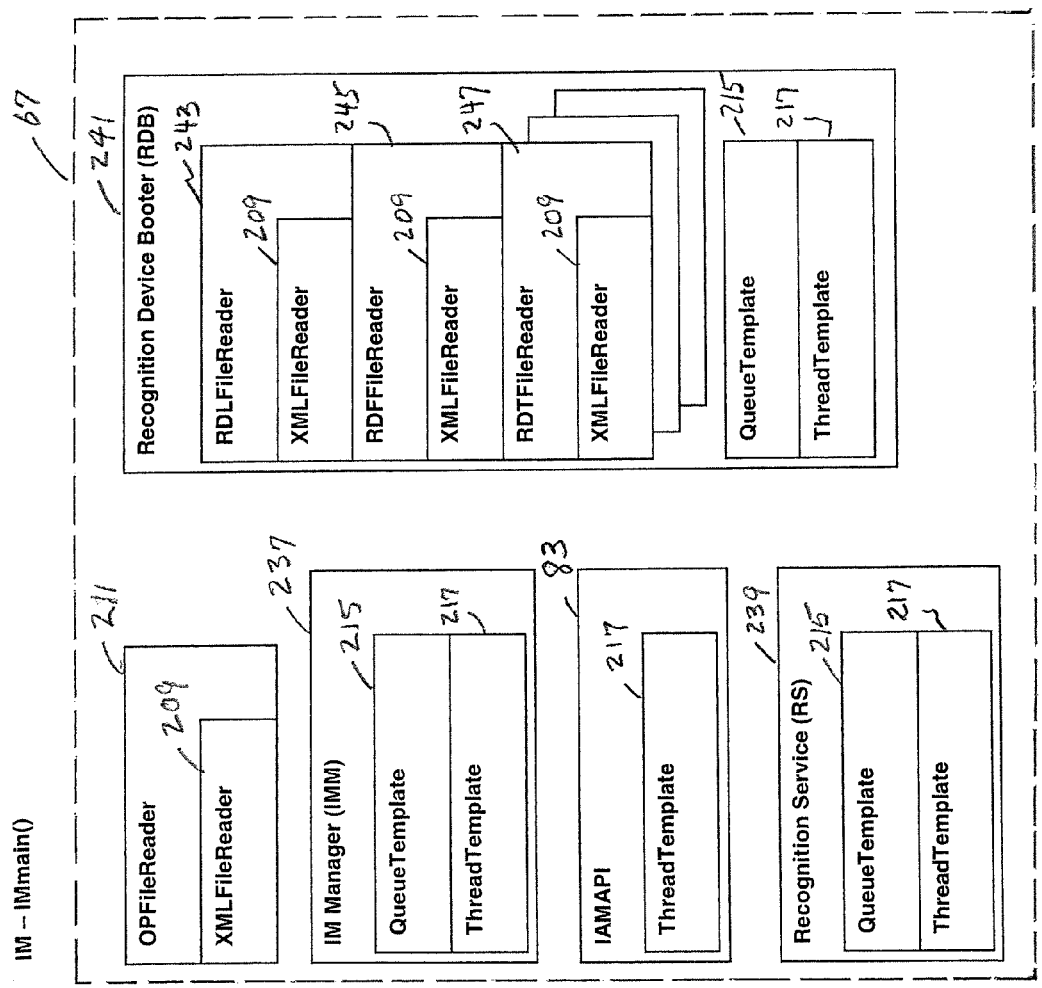
FIG. 13 is a block diagram which shows the component module structure of the IM (input manager) module.

FIG. 13 shows the component structure of the input manager (IM) 67. The input manager contains an operating property file (OPF) file reader 211 with a dedicated code reader 209, an input manager-manager (IMM) 237 containing a queue template 215 and a thread template 217. Also contained is an interaction manager application program interface (IAM API) 83 with an imbedded thread template 217. The input manager (IM) 67 also includes a recognition service (RS) module 239 and a recognition device booter (RDB) module 241. Each has a respective queue template 215 and a thread template 217. The recognition device booter (RDB) 241 contains a recognition data list (RDL) file reader 243, a recognition data file (RDF) file reader 245, and a recognition data type (RDT) file reader 247. Each of these readers 243, 245, 247 has an embedded code file reader 209.

Figure 14:
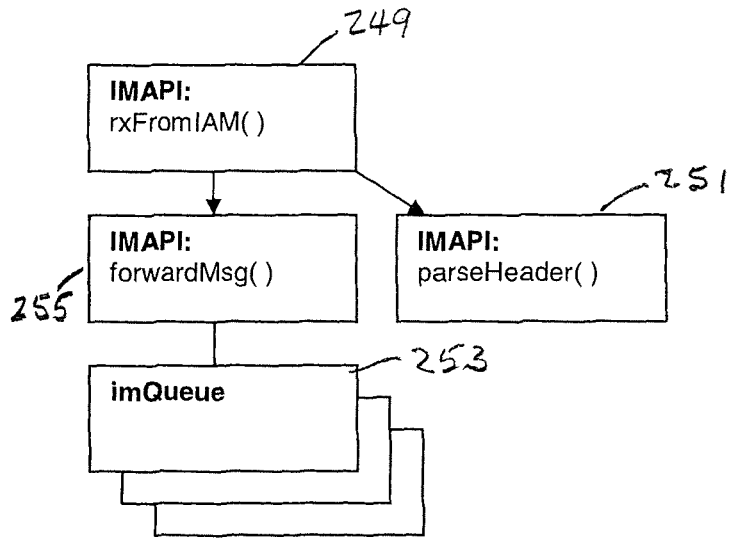
FIG. 14 is a flow diagram which shows how the IM receives messages from the IAM (interaction manager) through a "listening thread"

FIG. 14 is a flow diagram showing the input manager, specifically, the input manager application program interface (IM AAPI) 83 receiving messages through a listening thread labeled "rxFromIAM". When a messaged is received from the IAM 69, a message header parser is used to read the header 251. If it is determined to add or to continue a message on the imQueue 253, a function forward message is used to add update an existing queue 255.

Figure 15:
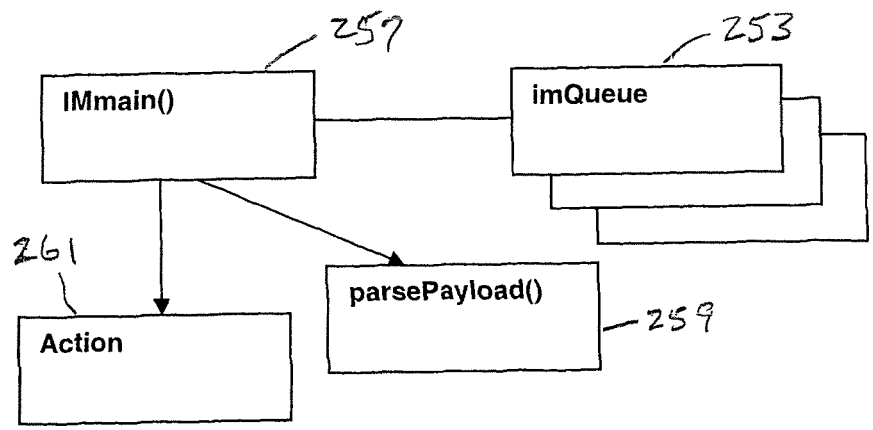
FIG. 15 is a flow diagram which shows how the ODM (object data manager) module uses the IMmain to invoke the commands that are put into queue.

FIG. 15 shows how the ODM (object data manager) 71 uses the IMmain 229 thread to invoke commands 257 put onto the queue 253. The IMmain 229 will iterate through the queue 253 calling a parsePayload to read the message 259. The IMmain then enacts what action the messages states 261.

Figure 16:
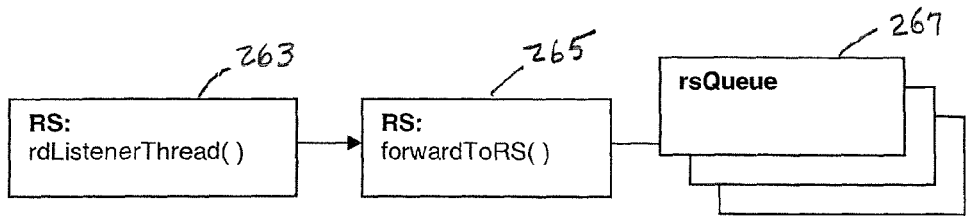
FIG. 16 is a flow diagram which shows how the IM (input manager) module received messages from the RD (recognition device) module.

FIG. 16 is a flow diagram of how the IM (input manager) 69 receives messages from the RD (recognition device) 95. The "rdListenerThread" pick up a message from the recognition device 263. The "rdListenerThread" calls forward to the recognition service (RS) 265 to place the message onto a queue 267 before the next message is received or picked up.

Figure 17:
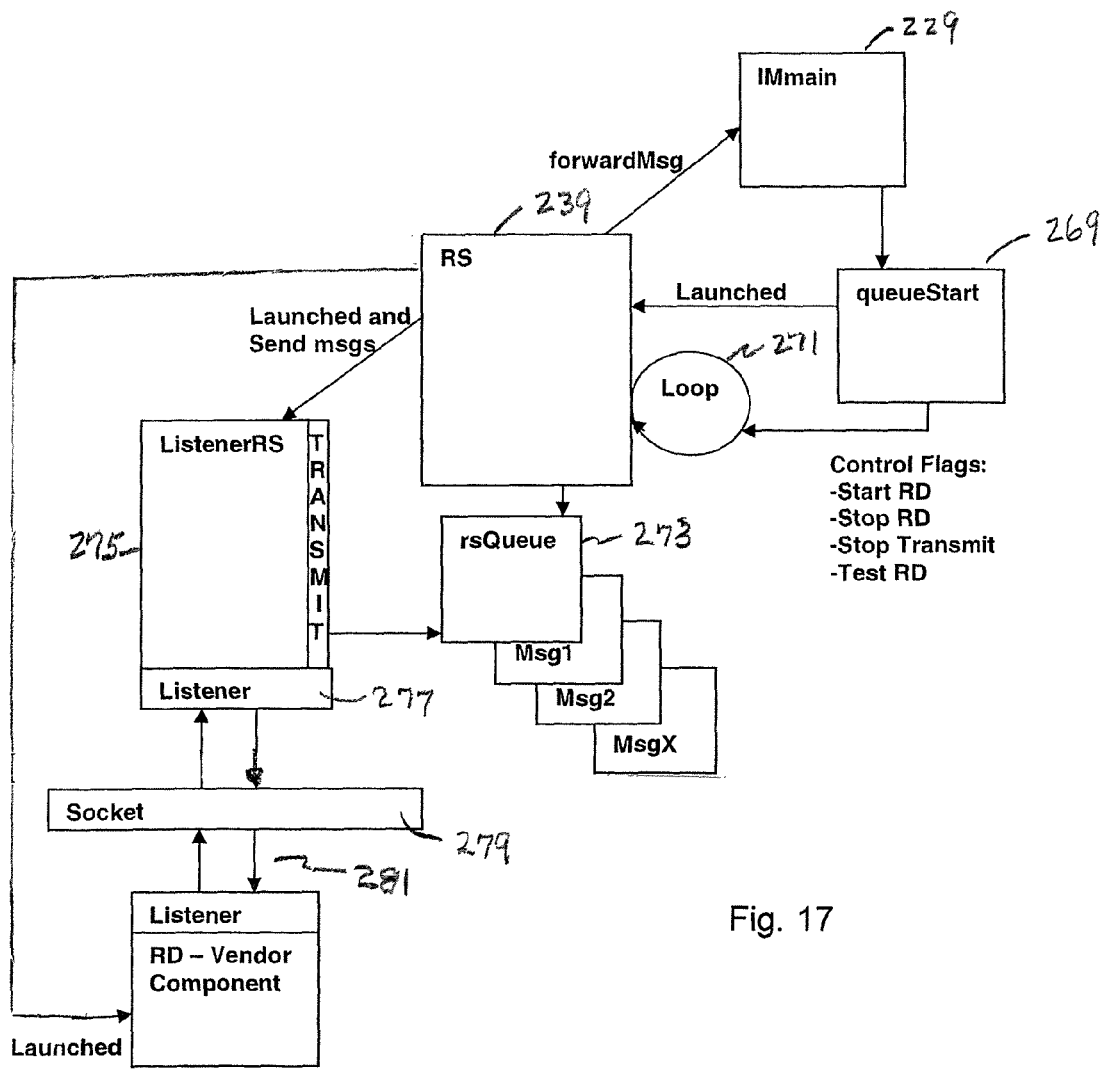
FIG. 17 is an interaction diagram which shows how the RS (recognition service) module interacts with the component modules connected to it.

FIG. 17 is an interaction diagram which shows how the input manager (IM) 67 interacts with the component module connected to it. A queue start function 269 starts all of the recognition service threads to pass messages to them that are commanded by the IMmain 229. The recognition service 239 continuously loops 271 to read messages off of the "rsQueue" 273 and to initiate a command that the recognition service 239 has received through a control flag. The recognition service 239 will launch the recognition device 95 when commanded. The recognition service will also launch a listener thread 275 in order of necessary precedence base on the recognition device type. The recognition service 239 iterates through the "rsQueue" upon command. The listener 277 interfaces through a socket connection 279 depending upon the recognition device type specified by a program file. Two way communications is possible with the recognition device.

Figure 18:
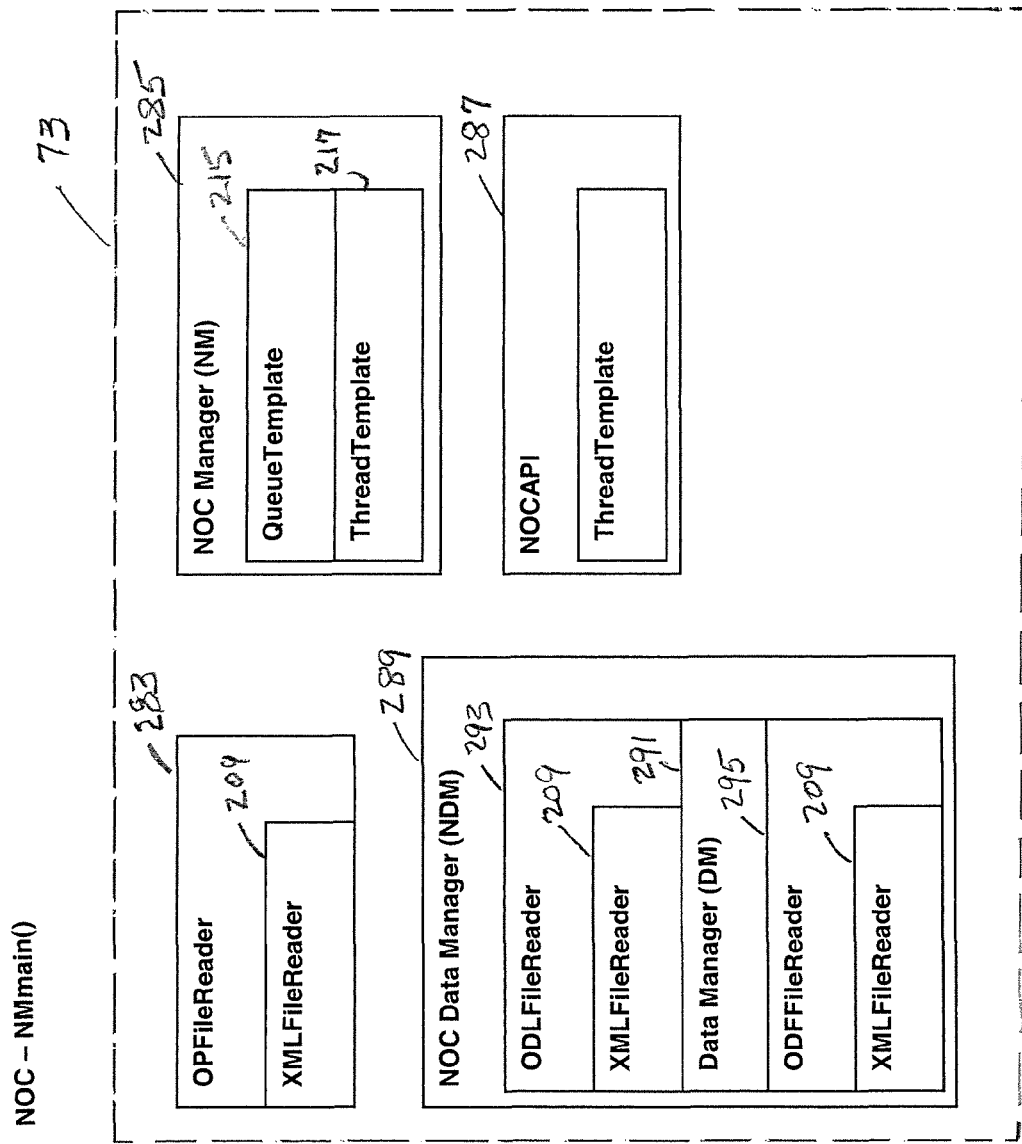
FIG. 18 shows the component structure of the NOC (new object creation) module.

FIG. 18 shows the component structure of the NOC (new object creation) module 73. The NOC uses a shared library property parser, OP file reader (operating properties) file reader 283 that inherits information from a code file reader 209. A NOC manager (NM) inherits from a base class of queue template 215 and thread template 217 to a non-priority queue for NMmain to check and iterate without adding a message to the queue. A new object creation application program interface (NOCAPI) 287 inherits from thread template 217 in order to handle incoming and outgoing messages from the IAM (interaction manager) 69. A NOC data manager (NDM) 289 inherits from the data manager (DM) 291 to have two code parsers (code file readers) 209 imbedded in an object data list file reader (ODL file reader) 293 and an object data file reader (ODF file reader) 295. A list start file (LSF), not shown in this figure, will contain the object data started at boot. The object data file (ODF) will contain all of the individual object data information. Object data are characterized in word in a language, for example, English. The NOC is responsible and allows creation and use of object data. It also controls the inactive object data.

Figures 19, 22:
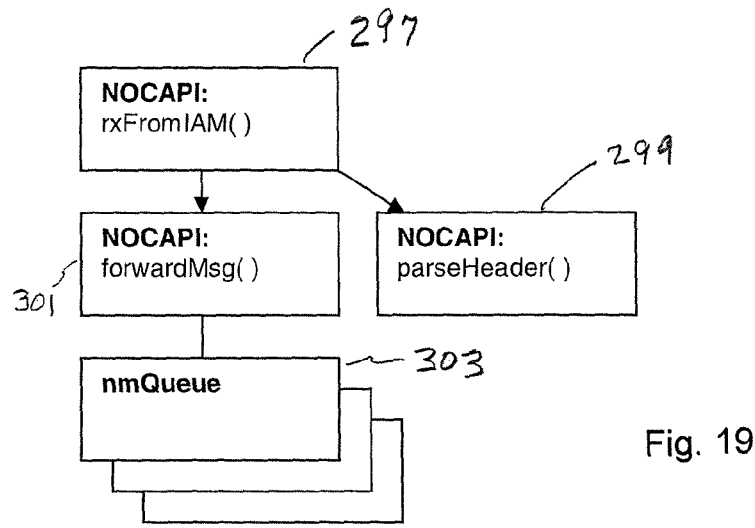
FIG. 19 is a flow diagram which shows how the NOC receives messages from the IAM (interaction manager) module through a "listening thread"
FIG. 22 is a flow diagram which shows how the TOB is used within the OMMS.

FIG. 19 is a flow diagram showing how the new object creation module receives messages from the interaction manager through a listening thread "rxFromIAM". When a message is received, a message header parser is used to read the header called parse header 299. A function "forwardmessage" is used to add or update an existing message 301 on the nm Queue 303.

Figure 20:
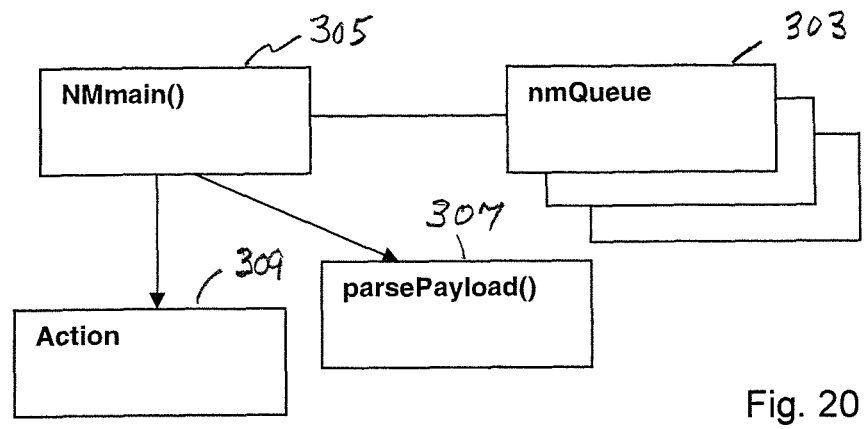
FIG. 20 is a flow diagram which shows how the NOC module uses the NMmain (NOC manager main) to invoke the commands that are put onto the queue.

FIG. 20 shows how NOC 73 uses the listening thread NMmain 305 to invoke the commands that are put into the queue nmQueue 303. NMmain 305 will iterate through the nmQueue 303 calling parsePayload 307 to read the message which NMmain will enact 309.

Figure 21:
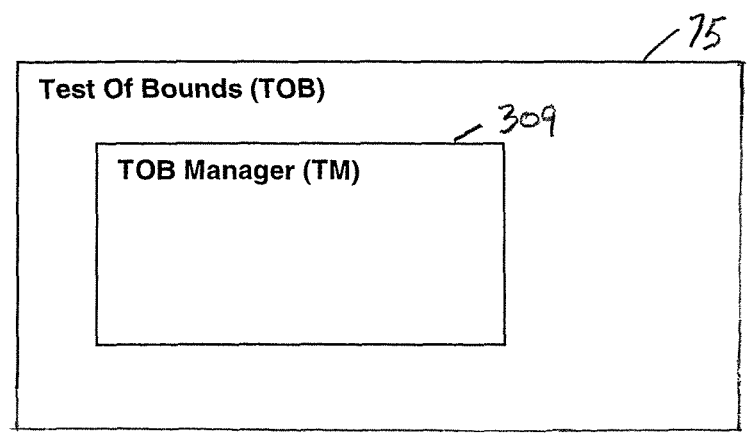
FIG. 21 shows the component structure of the TOB (test object bounds) module.

FIG. 21 shows the component structure of the TOB (test of bounds) 75 module which principally contains a TOB manager (TM) 307. The test of bounds manager contains all of the tests used to ensure the integrity of the object data.

FIG. 22 is a flow diagram of how TOB is used within the invention. TOB 75 is responsible for testing the object data within the local areas of the system. This will ensure that no errors within the system of the invention (OMMS) will manifest into a customer's software service. This is used as a diagnostic tool within the system before the customer application is "packaged" and sent to a customer.

Having received a call from the object data manager, or from active or inactive memory or from NOC, the test of bounds manager runs an object data test to find holes within the data 313. Thereafter, the relationship is examined 315, the name 317, and the type 319, location 321 and relation mismatch 323 are determined.

The invention uses points of interest (POIs) to populate a learning analysis of an input signal-message. If on a first analysis the object database does not provide sufficient information to "recognize" and "learn" the information in a specific input signal-message, the analysis is put in the queue and revisited in turn, iteratively, until there is sufficient matching information to decipher the signal-message. It is thereafter converted into a format, protocol, signal frequency, signal strength, etc. that the destination customer is prepared to receive and understand.

Components and Modules

Within the present invention, the individual components and/or modules have a dedicated purpose, function and an interaction with other components. Within the scope of the present invention the following are to be understood as follows.

A "manager" is hardware or software intelligence that supervises and controls certain functions of specified modules within its purview.

An "object" is any physical or virtual thing that needs to be abstracted within the OMMS invention.

A "thread" is an active monitoring node for receiving information from another module.

A "service action" is an output instruction that contains data or other signal. It may be predefined in a programmed database, or it may be developed as a function of an incoming signal or instruction or data during the conversion and/or transformation processes of the invention.

A "bound" is a theoretical limit to a data set to be utilized in the conversion and/or transformation processes of the invention.

A "set" is a collection or grouping of similar data types.

A "service request" is an input signal, request or data to be operated upon by the invention to provide an output to customers.

A "token" is a processing request or an internal processing directive generated within the invention based upon an input from a source device.

A "queue" is a sequential collection of directives and/or operating instructions available in sequential order.

The "imQueue" holds POI sets or signal elements and is interrogated by the IMmain function to provide information to the IAM for further processing of commands and information.

The "reQueue" holds tokens from the recognition device (RD) and is interrogated by the recognition service (RS) to provide a POI or requested signal element to be passed to the imQueue for further processing of the IAM.

The "rmQueue" holds commands and is interrogated by NMmain to provide reports of testing object data to developers for the analyzing of object data integrity.

An "AI" (artificial intelligence) is a customer, which receives an output, the AI being implemented in either hardware, software, or a combination of both, which control equipment operation.

A "software service" is a customer, which receives and output, the software service provider having a software-driven interface for receiving invention outputs.

A "socket" is hardware or software signal transmission portal or connection, generally to a local area network or a wide area network.

A "queue template" is software container class which is generally constructed by the module for the purpose of thread and data control flow.

A "thread template" is a type of threading software utilization, generally constructed by the module to hold a queue template for the purpose of parallel tasking.

A software "thread" is the smallest execution block performed by a processor.

"AMMmain" is the communications thread connection to AMM (the activity memory manager) to process POI sets to retrieve object data information to determine the meaning of a command.

"IAMmain" is the communications thread connection to IAM (the interaction manager) to control message flow to receive commands in order to send a service command to a customer.

"IM" (input manager) is a supervisory circuit or software module which manages recognition devices in order to interact with IAM for the purpose of message interpreting a commanding actions to a software service.

"IAM" (interaction manager) is a supervisory circuit or software module which manages OMMS in order to interact with a software service for the purpose of message interpreting and commanding actions to a software service.

"ODM" (object data manager) is a supervisory circuit or software module which manages object data utilization in order to interact with objects in a virtual sensed for the purpose of understanding an incoming command from an end-user.

"NOC" (new object creation) is reporting service to ensure object data integrity.

"TOB" (test object bounds) is a software module which goes into object data to test for known object data integrity holes, such as missing properties, types, and relational sets.

"API" (application program interface) is a particular set of rules and specifications that a software program can follow to access and make use of the services and resourced provided by another particular software program that implements that API.

"OAM" (operations action manager) is a software module which manages OMMS through a thread IAMmain.

"SAM" (service action manager) is a software module which controls service actions based upon action commands received from the ODM.

"RD" (recognition device) is an input signal or data feed which interacts from some piece of hardware to its own software interface (RD interface).

"NDM" (the NOC data manager allocates object data and is connected to the NOC.

"NM" (the NOC manager) does the processing of commands from the IAM and is connected to the NOC.

"POI" (point of interest) is data generated by incoming tokens from a recognition device for the purpose of understanding a command and is used by a POI set.

"POI set" (point of interest set) is data generated by incoming POIs for the purpose of identifying object data and is used to create a focal point.

"Focal point" is data generated by sets of "POI set" for the purpose of allocation object data for use by the POV.

"POV" (point of view) is data generated by a focal point in contrast to a single POI set for the purpose of determining and understanding and is used by the AMM to provide an actionable software service command.

"LSF file" (load start file) is and XML (extensible markup language) file connected to the DM XML reader.

"ODF filer" (object data filer) is XML is connected to DM XML reader.

"RS" (recognition service) is a software thread used for reading recognition device information and is connected to the IM.

"OP file reader" (operating property file reader) is an XML reader connected to the IM, IAM, NOC and ODM.

"RDL file reader" (recognition device list file reader) is an XML file parser connected to RDB.

"RDF file reader" (recognition device file reader) is an XML file parser connected to RDB.

"RDT file reader" (recognition device type file reader) is an XML file parser connected to RDB.

"SL file reader" (service list file reader) is an XML file parser connected to SAM.

"SA file reader" (service action file reader) is an XML file parser connected to SAM.

"Parsing" is a process of analyzing a text made in a sequence of tokens (for example words), to determine its grammatical structure with respect to a give (more or less) formal grammar. Parsing references how phrases are divided into "garden path" sentences of natural languages or of inflected languages.

Many changes can be made in the above-described invention without departing from the intent and scope thereof. It is therefore intended that the above description be read in the illustrative sense and not in the limiting sense. Substitutions and changes can be made while still being within the scope and intent of the invention and of the appended claims.

The invention claimed is:

1. A system for implementing a learning process comprising:
    a plurality of sources; and
    an operating system processor including instructions for:
        receiving input signals from said plurality of sources, said receiving including the learning of the destination, the characteristics, the format and the protocol of each received signal;
        recognizing said source of said input signals and the customer of said input signals;
        converting said input signals according to object data into a points of interest (POI) set;
        creating a customer instruction set recognizable by said recognized customer from said POI set according to object data; and
        sending said customer instruction set to destination of said recognized customer;
    wherein said input signals from said plurality of sources are used for creating instruction signals recognizable by customers;
    wherein said operating system processor is a hardware processor operating under the control of said instructions;
    said plurality of sources include individual inputs from textual (OCR) sources and verbal signal sources; and
    said input signals of said plurality of sources are received by said operating system processor via local area networks (LANs) or wide area networks (Internet);
    wherein said recognizing includes using an object database to detect message characteristics, comparing message characteristics of said input signals to said object data, repeated comparing with object data in said object database until sufficient matching results in deciphering said input signals or object data is recognized not to exist for sufficient matching;
    wherein when object data is recognized to not exist, said recognizing further includes adding of object data by successively testing the bounds of message characteristics each time in accordance with service actions within customer requirements by verifying words through a neo-objects external application for new object creation, wherein a new item of object data is learned.

2. The system of claim 1, wherein said comparing includes recognizing patterns in textual and verbal content or other sensor information in said input signals and addressing object data associated therewith.

3. The system of claim 2, wherein said receiving said input signals includes receiving multiple input signals that are processed on a first-in-first-out priority.

4. A system for implementing a learning process comprising:
    a plurality of sources; and
    an operating system processor including instructions for:
        receiving input signals from said plurality of sources, said receiving including the learning of the destination, the characteristics, the format and the protocol of each received signal;
        recognizing said source of said input signals and the customer of said input signals;
        converting said input signals according to object data from an object database into a points of interest (POI) set;
        creating a customer instruction set recognizable by said recognized customer from said POI set according to object data; and
        sending said customer instruction set to destination of said recognized customer;
    wherein said input signals from said plurality of sources are used for creating instruction signals recognizable by customers;
    wherein said operating system processor is a hardware processor operating under the control of said instructions;
    wherein said points of interest set is used to derive a focal point and create a plurality of customer instructions sets until released;
    wherein said object database having a relationship structure for use by said operating system processor comprising:
    object data defines a relationship structure to itself to define how it relates to other object data; and
    object data relationships defines an association of use; and
    object data characteristics define attributes; and
    object data characteristics dictate possible use of customer instructions; and
    object data characteristics dictate possible use of information for a piece of data within the customer instruction sets; and
    object data defining file usages that are used in conjunction with input sources and customers.

5. The system of claim 4, wherein said focal point handles the adding and releasing of said points of interest set, and allocation of object data to discern a customer action.

6. The system of claim 4, wherein said focal point derives a point of view for calculating the customer instruction sets while using pattern recognition to handle errors received in the input signals.

7. The system of claim 4, wherein said customer instruction set is created through the use of object data while using pattern recognition to handle errors received in the signal from the sensors, recognition devices and services.

8. The system of claim 4, wherein said operating system processor uses said object database relationship structure to calculate a probability of the customer instruction set.

9. The system of claim 4, wherein said operating system processor uses said object database relationship structure to create said customer instruction set by allowing the population of data format for customer instructions.

10. The system of claim 4, wherein said customer instruction set includes structure comprising:
    customer instructions defining an intended action; and
    customer instructions defining a data format and protocol; and customer instructions defining attributes that associates object data to the intended action; and customer instructions containing attributes for the allowed data format of said action; and customer instructions having data format attributes defining use of object data function to compute said data format of said intended action; and customer instructions triggering additional customer instructions to be created for one or many actions as dictated by the customer instructions.

11. The system of claim 10, wherein said customer instruction data format is customizable by a user to a desired format for initial implementation and subsequent implementations.

12. The system of claim 10, wherein said action defines a destination to receive the customer instruction set.

13. A system for implementing a learning process in a control system that operates machinery or equipment comprising:

a plurality of sources including communication devices; and an operating system processor including instructions for:

receiving input signals in the form of voice signals or text messages from said plurality of sources, said receiving including the learning of the destination, the characteristics, the format and the protocol of each received signal;

recognizing said source of said input signals and the customer of said input signals;

converting said input signals according to object data into a points of interest (POI) set;

creating a customer instruction set recognizable by said recognized customer from said POI set according to object data; and sending said customer instruction set to destination of said recognized customer;

wherein said input signals from said plurality of sources are used for creating instruction signals recognizable by customers to operate said machinery or said equipment;

wherein said operating system processor is a hardware processor operating under the control of said instructions;

said plurality of sources include software operating on cell phones; and said input signals of said plurality of sources are received by said operating system processor via local area networks (LANs) or wide area networks (Internet);

wherein said recognizing includes using said object database to detect message characteristics, comparing message characteristics of said input signals to said object data, repeated comparing with object data in said object database until sufficient matching results in deciphering said input signals or object data is recognized not to exist for sufficient matching;

wherein when object data is recognized to not exist, said recognizing further includes adding of object data by successively testing the bounds of message characteristics each time in accordance with service actions within customer requirements by verifying words through a neo-objects external application for new object creation, wherein a new item of object data is learned.

14. The system of claim 13, wherein said comparing includes recognizing patterns in textual and verbal content in said input signals and addressing object data associated therewith and said creating includes recognizing a first machine to be operated and the instruction signals necessary to operate said first machine.

* * * * *